(No Model.)

T. J. BLAKE.
FORK AND RAKE.

No. 269,624. Patented Dec. 26, 1882.

Witnesses:—
Thomas J. Patterson
Saml. Cunningham

Thomas J. Blake.
by Connolly Bros. & McTighe
Attorneys.

UNITED STATES PATENT OFFICE.

THOMAS J. BLAKE, OF PITTSBURG, PENNSYLVANIA.

FORK AND RAKE.

SPECIFICATION forming part of Letters Patent No. 269,624, dated December 26, 1882.

Application filed August 11, 1882. (No model.)

*To all whom it may concern:*

Be it known that I, THOMAS J. BLAKE, of Pittsburg, in the county of Allegheny and State of Pennsylvania, have invented certain new and useful Improvements in Forks and Rakes; and I do hereby declare that the following is a full, clear, and exact description of the invention, which will enable others skilled in the art to which it appertains to make and use the same, reference being had to the accompanying drawings, which form a part of this specification, in which—

Figure 1:
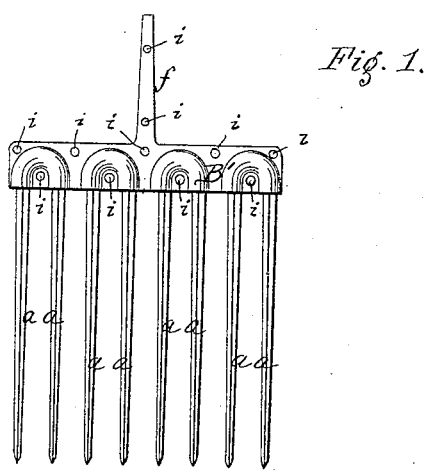
Figure 2:
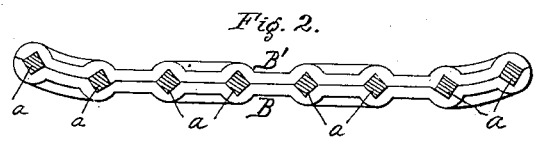
Figure 3:
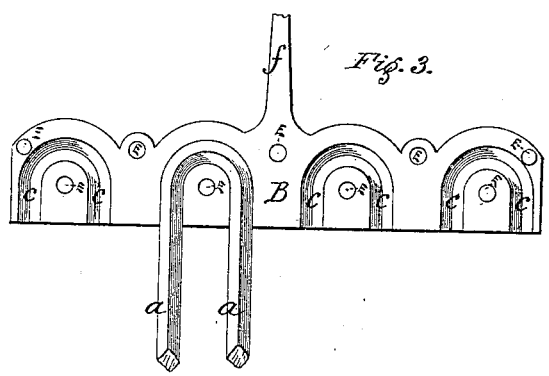

Figure 1 is a plan view of my improved fork. Fig. 2 is a transverse section of the same enlarged. Fig. 3 is a plan view of one head, showing the mode of insertion of the tines.

This invention relates to the manufacture of forks—such as hay and manure forks, coke-forks, and rakes—the object being to construct them cheaply, while maintaining the strength, and confer the advantage of capability of repair when a tine breaks.

The invention consists in making the tines in pairs by bending a double-length blank into U shape, clamping these in between suitably-grooved heads at the bend, and securing them by rivets; and, further, in the article and in the construction and combination of parts, as hereinafter fully described and claimed.

In the drawings the construction is most clearly shown at Fig. 3.

I take a blank for the tine of double length, taper it or not, as required, bend it into U shape to bring the twin tines *a a* parallel, after which the shaping is done, and finally the tempering. I form two heads, B B', each having the U-shaped grooves *c*, exactly corresponding to the U-bend of the pair of tines *a a*, and the grooves in one head exactly matching those of the other head. Each head has the matching rivet-holes *e* alternately within the U-grooves *c* and without them, as shown. The tines, being bent, shaped, and tempered, are laid with their U ends lying in the grooves *c* of one head, B, going in half-way, or thereabout. Then the other head, B', is laid on top and the whole secured rigidly together by the rivets *i*, as shown at Fig. 1. In this form of fork or rake the tines are immovable, and can be given any of the usual forms for special uses. For forks the tang *f* is formed on the heads in two parts and riveted together, like the heads. For rakes the tang is bent at the proper angle, the only other difference being that the tines of the fork become short "teeth" in the rake; but the construction is generically the same.

The heads B B' may be formed by casting, either in ordinary metal or malleable iron, or they may be shaped by stamping or pressing out of a sheet. In either case the back or outside of the head along the line of the grooves *c* is raised or convex to strengthen the head.

Instead of rivets, screws may be used, particularly where the tines are liable to frequent breakage. In such event, by separating the heads B B' the broken pair of tines may be removed, replaced by a new pair, and the heads again secured together.

The heads may be curved, as shown at Fig. 2, to more easily obtain the concave form desired.

The tines or teeth *a a* may be square or round or other shape in cross-section; but I prefer the square form set on its corners, as shown in Fig. 2.

I claim as my invention—

1. A fork or rake composed of the U-shaped tines or teeth *a a*, in pairs, and the matching-heads B B', having the grooves *c*, embracing the tines or teeth between them, and secured together, substantially as described.

2. In a fork or rake, the twin tines or teeth *a a*, in one piece, bent to U shape at their middle, jointly with the heads B B', having on their inner faces grooves *c*, corresponding to the bends of the tines *a*, and held together by rivets or screws *i*, substantially as set forth.

In testimony that I claim the foregoing as my own I have hereto affixed my signature in presence of two witnesses.

THOMAS J. BLAKE.

Witnesses:
 THOMAS J. PATTERSON,
 D. E. DAVIS.